(12) United States Patent
Oh

(10) Patent No.: US 9,282,227 B2
(45) Date of Patent: Mar. 8, 2016

(54) CAMERA MODULE

(75) Inventor: Hyunah Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 229 days.

(21) Appl. No.: 13/996,892

(22) PCT Filed: Dec. 27, 2011

(86) PCT No.: PCT/KR2011/010135
§ 371 (c)(1),
(2), (4) Date: Jun. 21, 2013

(87) PCT Pub. No.: WO2012/091399
PCT Pub. Date: Jul. 5, 2012

(65) Prior Publication Data
US 2013/0293972 A1 Nov. 7, 2013

(30) Foreign Application Priority Data
Dec. 27, 2010 (KR) .......................... 10-2010-0135633

(51) Int. Cl.
*G02B 7/02* (2006.01)
*H04N 5/225* (2006.01)
*G03B 17/55* (2006.01)

(52) U.S. Cl.
CPC .............. *H04N 5/2254* (2013.01); *G03B 17/55* (2013.01); *H04N 5/2251* (2013.01)

(58) Field of Classification Search
USPC .......................................... 359/811, 820, 819
See application file for complete search history.

(56) References Cited

FOREIGN PATENT DOCUMENTS

| JP | 09-318859 A | 12/1997 |
| JP | 2006-251058 A | 9/2006 |
| KR | 10-2006-0094247 A | 8/2006 |
| KR | 10-2010-0102827 A | 9/2010 |

OTHER PUBLICATIONS

International Search Report dated Sep. 19, 2012 issued in Application No. PCT/KR2011/010135.

*Primary Examiner* — Jack Dinh
(74) *Attorney, Agent, or Firm* — KED & Associates, LLP

(57) ABSTRACT

The present invention relates to a camera module mounted with an external look-forming holder improved in heat emission function, the camera module including: a housing; a lens insertion hole opened toward an upper surface of the housing for insertion of a lens; a filter attachment unit formed on a floor surface of the housing for attaching a filter; and a heat emission outlet formed on an upper surface of the lens insertion hole in an upper-wide/bottom-narrow shape, wherein a heat emission outlet is formed at an upper surface of a lens insertion hole to induce heat generated from inside of a housing to be emitted to outside along an inner side of the heat emission outlet.

20 Claims, 2 Drawing Sheets

CAMERA MODULE

CROSS-REFERENCE TO RELATED PATENT APPLICATIONS

This application is a U.S. National Stage Application under 35 U.S.C. §371 of PCT Application No. PCT/KR2011/010135, filed Dec. 27, 2011, which claims priority to Korean Patent Application No. 10-2010-0135633, filed Dec. 27, 2010, whose entire disclosures are hereby incorporated by reference.

TECHNICAL FIELD

The teachings in accordance with the exemplary embodiments of this invention relate generally to a camera module configured with a holder in a radiating structure, and more particularly to a camera module configured to prevent constituent parts from being deformed by high temperature heat through a simple improvement in holder structure without incurring any cost increase in the constituent parts, whereby the camera module thus improved can be used for general purpose.

BACKGROUND ART

Recently, demands on a small-sized compact camera module are on the increase for use in various multimedia fields including notebook type personal computers, camera phones, PDAs (Personal Digital Assistants), smart phones and toys, and further in image input equipment including monitoring cameras and information terminals for video tape recorders. Particularly, designs are elements that have a great influence on sales of mobile phones, whereby small-sized camera modules are greatly demanded.

The camera module generally includes a holder, a PCB (Printed Circuit Board), an optical system, a filter and an image sensor. The holder is formed with an insertion hole for inserting lenses, and is mounted thereunder with the PCB. The PCB is mounted thereon with an image sensor or a photoelectric conversion device such as a CCD (Charge Coupled Apparatus) type or a CMOS (Complementary Metal Oxide Semiconductor) type to converge light from an object to a photosensitive element and to form an image of the object.

FIG. 1 is a perspective view illustrating a holder structure of a camera module according to prior art, and FIG. 2 is a perspective view illustrating a rear structure of the holder structure.

Referring to FIG. 1, an exterior of a housing (1) is closed, and the housing (1) is formed with an upper surface-opened lens insertion hole (2) into which a lens can be inserted.

Referring to FIG. 2, a rear surface of the housing (1) is formed with a filter attachment (3) for attaching an infrared blocking filter, and one side of the rear surface is formed with an outlet (4) for discharging fumes generated in the course of process.

As illustrated by dotted lines in FIG. 2, an adhesive is coated on three surfaces of the filter attachment (3) to prevent the outlet (4) from being blocked. The coating of adhesive only on three surfaces decreases an attachment force of the filter, and may cause defects such as burning and degradation due to residual fumes remaining in the narrowed fume-discharging outlet.

Another disadvantage in the conventional camera module is that a high temperature heat is not discharged outside after a process of bonding a holder and a PCB under the high temperature of more than 80 Celsius, resulting in generation of deformed parts, defects, decrease in resolution, burning and/or degradation caused by deformed plastic lens.

Particularly, a reflowable camera module through an SMD (Surface Mount Device) process undergoes a very high temperature of more than 260 Celsius, such that a radiating measure is very important, in addition to measures to prevent generation of defects in the manufacturing course.

A plastic material having a high thermal conductivity has been conventionally used to solve the aforementioned disadvantages, or radiating methods including a double injection molding of a metal and use of coated surface layer have been utilized. However, these methods have disadvantageously increased costs in parts and processing procedures. Furthermore, these methods are weak to control on foreign objects.

DISCLOSURE OF INVENTION

Technical Problem

In order to resolve the above-mentioned problems and/or disadvantages, the present invention discloses a holder structure-improved camera module manufacturable in a reasonably priced plastic material to maximize radiation effect and to prevent parts cost from increasing. The present invention is also directed to a camera module configured to improve an adhesive strength of a filter, whereby fume discharge and heat radiation can be effectively enhanced.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a camera module, the camera module comprising: a housing; a lens insertion hole opened toward an upper surface of the housing for insertion of a lens; a filter attachment unit formed on a floor surface of the housing for attaching a filter; and a heat emission outlet formed on an upper surface of the lens insertion hole in an upper-wide/bottom-narrow shape.

Preferably, the heat emission outlet is inwardly inclined from an upper side to a bottom side.

Preferably, a plurality of heat emission grooves along a circumference of the heat emission outlet.

Preferably, an external wall of the housing is formed with a knurled unit in which a plurality convex surfaces and a plurality of concave surfaces are alternatively formed to increase a contact area with outside air.

Preferably, an external wall of the housing is formed with a knurled unit in which a plurality convex surfaces and a plurality of concave surfaces are alternatively formed to increase a contact area with outside air.

Preferably, an external wall of the housing is formed with a knurled unit in which a plurality convex surfaces and a plurality of concave surfaces are alternatively formed to increase a contact area with outside air.

Preferably, the knurled unit is formed along a circumference of the external wall of the housing.

Preferably, a circumference of the filter attachment unit is erected with a guide wall to regulate a thickness unit of a filter.

Preferably, the filter attachment unit is inwardly depressed from a base unit of a holder, and the guide wall is protrusively formed on the filter attachment unit.

Preferably, corners of the filter attachment unit are formed with fume emission outlets to emit fumes.

Preferably, the fume emission outlet is inwardly depressed from the filter attachment unit.

In another general aspect of the present invention, there is provided a camera module, the camera module comprising: a housing; a lens insertion hole opened toward an upper surface of the housing for insertion of a lens; a filter attachment unit formed on a floor surface of the housing for attaching a filter; and a plurality of heat emission grooves formed along a circumference of an opening formed at an upper surface of the lens insertion hole.

Preferably, an external wall of the housing is formed with a knurled unit in which a plurality convex surfaces and a plurality of concave surfaces are alternatively formed to increase a contact area with outside air.

Preferably, the knurled unit is formed along a circumference of the external wall of the housing.

Preferably, a circumference of the filter attachment unit is erected with a guide wall to regulate a thickness unit of a filter.

Preferably, the filter attachment unit is inwardly depressed from a base unit of a holder, and the guide wall is protrusively formed on the filter attachment unit.

Preferably, corners of the filter attachment unit are formed with fume emission outlets to emit fumes.

Preferably, the fume emission outlet is inwardly depressed from the filter attachment unit.

Advantageous Effects of Invention

The camera module according to the present invention has an advantageous effect in that a heat emission outlet is formed at an upper surface of a lens insertion hole to induce heat generated from inside of a housing to be emitted to outside along an inner side of the heat emission outlet, a high heat emission effect can be obtained free from using a high-priced plastic material or a double injection molded material, and a heat radiation effect can be enhanced through an improved structure instead of selection of material for use in various types of camera modules for general purposes.

The camera module according to the present invention has another advantageous effect in that an external wall of a housing is formed with a knurled unit in which a plurality convex surfaces and a plurality of concave surfaces are alternatively formed to increase a contact area with outside air, whereby a high heat radiation effect can be expected.

The camera module according to the present invention has still another advantageous effect in that a filter attachment unit is inwardly depressed from a base unit of a holder, and a circumference of the filter attachment unit is erected with a guide wall to regulate a thickness unit of a filter, whereby an adhesive strength of the filter is improved to sufficiently obtain a space in which inner heat can be convected from under the holder.

The camera module according to the present invention has still further advantageous effect in that each corner of the filter attachment unit is formed with a fume emission outlet to emit fumes, whereby a fume emission space can be sufficiently obtained and all four corners of the filter can be securely attached to the filter attachment unit.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
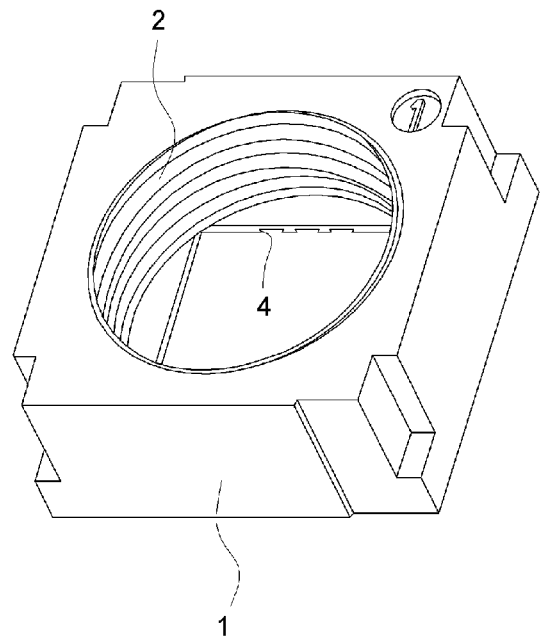
FIG. 1 is an external perspective view of a holder of a camera module according to prior art.
Figure 2:
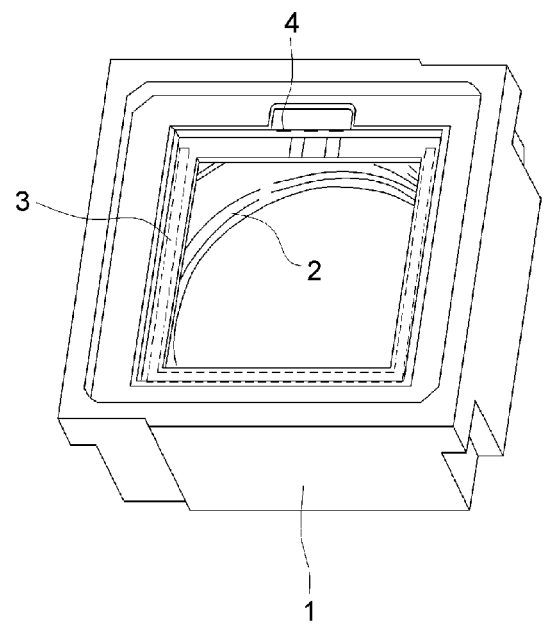
FIG. 2 is a perspective view of a rear surface structure of a holder at a camera module according to prior art.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application (s) or use(s) of the present invention.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Figure 3:
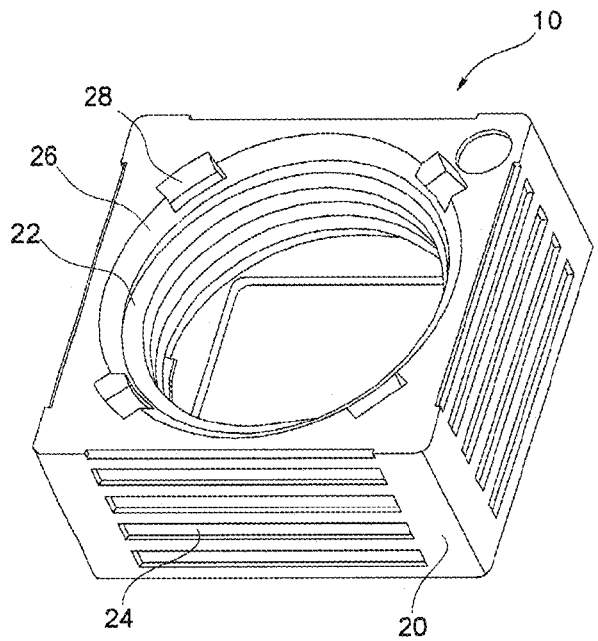
FIG. 3 is an external perspective view of a heat emission holder at a camera module according to an exemplary embodiment of the present invention.

FIG. 3 is an external perspective view of a heat emitting holder structure at a camera module according to an exemplary embodiment of the present invention, where a holder (10) according to an exemplary embodiment of the present invention takes a shape of a rectangular box-injection molded with plastic material.

A rectangular box-shaped housing (20) is centrally formed with a hollow lens insertion hole (22). The lens insertion hole (22) is formed with grooves each coupled to a lens for insertion of a plurality of lenses. The lens insertion hole (22) is formed thereon with a heat emission outlet (26) in an upper-wide/bottom-narrow shape. The heat emission hole (26). The heat emission outlet (26) may be inwardly inclined from an upper side to a bottom side to form a chamfer in the course of injection-molding the housing (20).

A plurality of heat emission grooves (28) is formed along a circumference of the heat emission outlet (26). Each of the heat emission grooves is more inwardly and concavely formed than the heat emission outlet (26). The heat emission outlet (26) and the heat emission grooves (28) serve to emit upwardly the heat generated from inside of the housing (20).

Referring to FIG. 3, an external wall of the housing (20) is formed with a plurality of accordion-shaped knurled units (24) in which a plurality convex surfaces and a plurality of concave surfaces are alternatively formed to increase a contact area with outside air. Each of the knurled units (24) is formed on each external surface (a total of four surfaces) of the housing (20) to increase a contact area with outside air, such that a sufficient heat emission characteristic can be obtained by an improved structure of the holder (10) through the knurled units (24) and the heat emission outlet (26).

Mode for the Invention

Figure 4:
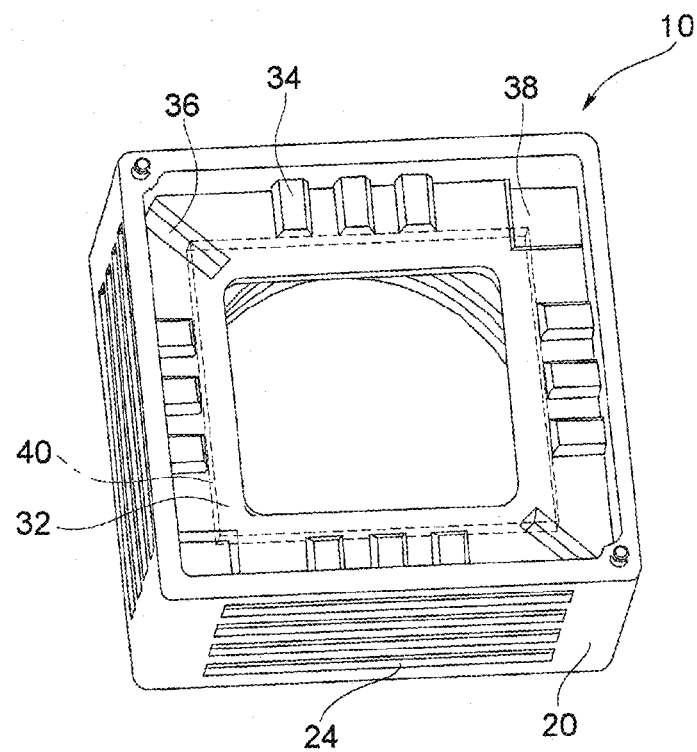
FIG. 4 is a perspective view of a rear surface structure of a heat emission holder at a camera module according to an exemplary embodiment of the present invention.

FIG. 4 is a perspective view of a rear surface structure of the holder (10) at a camera module according to an exemplary embodiment of the present invention.

Referring to FIG. 4, a rear surface of the housing (20) is formed with a filter attachment unit (32). The filter attachment unit (32) is inwardly depressed from a base unit of the holder (10) to form a sufficient space between the base unit of the holder (10) and the filter attachment unit (32). A guide wall (34) is protrusively erected on a circumference of the filter attachment unit (32) to regulate a thickness unit of a filter (40). Corners of the filter attachment unit (32) are formed with fume emission outlets (36, 38) to emit fumes.

The guide wall (34) is a portion downwardly bulged from the filter attachment unit (32), such that an interior of the housing (20) is formed with an inner space increased in volume as much as that of the guide wall (34). In a case the inner space of the housing (20) increases, a heat-convective area inside the housing is broadened to further enhance the heat emission effect in association with the heat emission structure formed outside of the housing (20).

Furthermore, the guide wall (34) is convexly bulged around the filter attachment unit (32) whereas the fume emission outlets (36, 38) are concavely formed. In a case the guide wall (34) and the fume emission outlets (36, 38) are formed in knurled shapes, a contact area with air at a bottom of the holder (10) can be increased to obtain an excellent heat emission characteristic.

Due to the fact that the fume emission outlets (36, 38) are formed on corners of the filter attachment unit (32) in a groovy shape, all four corners of a filter (40) can be attached to the filter attachment unit (32), and the guide wall (34) can regulate a thickness unit of the filter (40), whereby the filter (40) can be securely positioned to allow the holder structure according to the present invention to greatly enhance a filter attachment force.

Besides, the formation of the fume emission outlets (36, 38) on corners of the filter attachment unit (32) in a groovy shape allows the fume emission outlets (36, 38) to be cut in a sufficient size, whereby fumes are prevented from remaining inside the housing (20).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has an industrial applicability in that the novel idea of the present invention can be applied to a small-sized camera module using a voice coil motor as an automatic focus adjusting unit.

The invention claimed is:
1. A camera module with a heat emitting holder structure, the holder comprising:
   a housing;
   a lens insertion hole formed in the housing for insertion of a lens to the housing;
   a filter attachment unit formed on rear surface of the housing for attaching a filter thereto; and
   a heat emission outlet extendedly formed on the lens insertion hole in an upper-wide/bottom-narrow shape, wherein the heat emission outlet communicates the lens insertion hole.
2. The camera module of claim 1, wherein the heat emission outlet is formed on an upper surface of the lens insertion hole, and wherein the heat emission outlet is inwardly inclined from an upper side to a bottom side relative to a center of the lens insertion hole.
3. The camera module of claim 2, further comprising a plurality of heat emission grooves disposed along a circumference of the heat emission outlet.

4. The camera module of claim 3, wherein an external wall of the housing is formed with a knurled unit in which a plurality convex surfaces and a plurality of concave surfaces are alternatively formed to increase a contact area with outside air.

5. The camera module of claim 2, wherein an external wall of the housing is formed with a knurled unit in which a plurality convex surfaces and a plurality of concave surfaces are alternatively formed to increase a contact area with outside air.

6. The camera module of claim 1, wherein an external wall of the housing is formed with a knurled unit in which a plurality convex surfaces and a plurality of concave surfaces are alternatively formed to increase a contact area with outside air.

7. The camera module of claim 6, wherein the knurled unit is formed along a circumference of the external wall of the housing.

8. The camera module of claim 1, wherein a circumference of the filter attachment unit is erected with a guide wall to regulate a thickness unit of a filter.

9. The camera module of claim 8, wherein the filter attachment unit is inwardly depressed from a base unit of the holder relative to a center of the lens insertion hole, and the guide wall is formed to protrude on the filter attachment unit.

10. The camera module of claim 1, wherein the holder further comprises a plurality of fume emission outlets to communicate with the filter attachment unit.

11. The camera module of claim 10, wherein the fume emission outlet is inwardly depressed from the filter attachment unit relative to a center of the lens insertion hole.

12. The camera module of claim 10, wherein the fume emission outlet is formed on corners of the filter attachment unit.

13. The camera module of claim 12, wherein the fume emission outlet is concavely formed to have a grooved shape.

14. A camera module with a heat emitting holder structure, the holder comprising:
 a housing;
 a lens insertion hole formed in the housing for insertion of a lens to the housing;
 a filter attachment unit formed around an opening on a rear surface of the housing for attaching a filter thereto; and
 a plurality of heat emission grooves extendedly formed and spaced apart on an upper surface of the lens insertion hole, wherein the heat emission grooves communicates with the lens insertion hole.

15. The camera module of claim 14, wherein an external wall of the housing is formed with a knurled unit in which a plurality convex surfaces and a plurality of concave surfaces are alternatively formed to increase a contact area with outside air.

16. The camera module of claim 15, wherein the knurled unit is formed along a circumference of the external wall of the housing.

17. The camera module of claim 14, wherein a circumference of the filter attachment unit is erected with a guide wall to regulate a thickness unit of a filter.

18. The camera module of claim 17, wherein the filter attachment unit is inwardly depressed from a base unit of the holder relative to a center of the lens insertion hole, and the guide wall is formed to protrude on the filter attachment unit.

19. The camera module of claim 14, wherein corners of the filter attachment unit are formed with fume emission outlets to emit fumes.

20. The camera module of claim 19, wherein the fume emission outlet is inwardly depressed from the filter attachment unit relative to a center of the lens insertion hole.

\* \* \* \* \*